July 19, 1927. A. W. MALONE Re. 16,684
METAL POLE
Original Filed Aug. 19, 1926
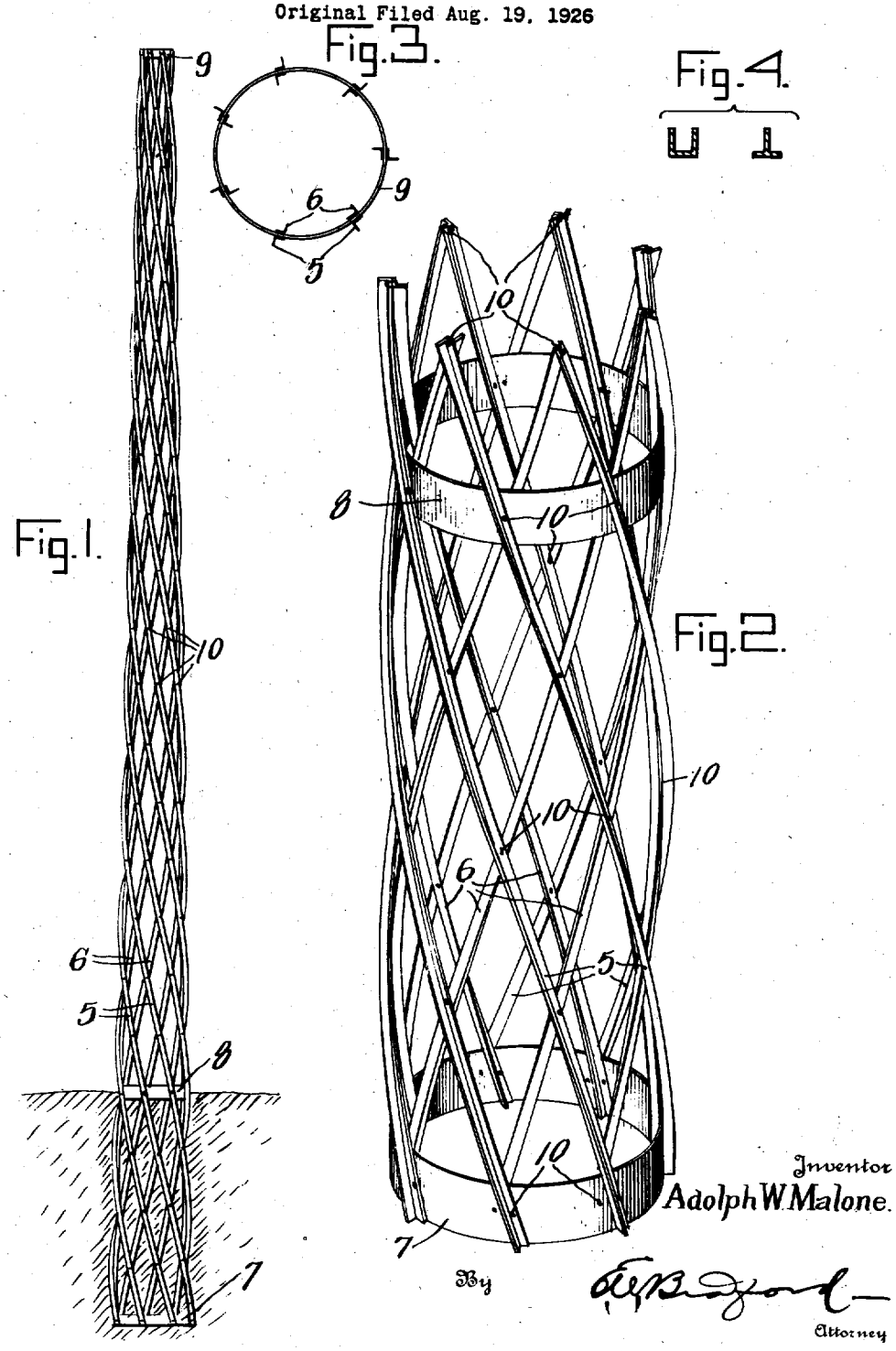
Inventor
Adolph W. Malone.
By
Attorney Reissued July 19, 1927. Re. 16,684

UNITED STATES PATENT OFFICE.

ADOLPH W. MALONE, OF FILLMORE, UTAH, ASSIGNOR, BY DIRECT AND MESNE ASSIGNMENTS, OF ONE-THIRD TO ALBERT H. VESTAL, OF ANDERSON, INDIANA, AND ONE-THIRD TO ALVAH M. LOCKWOOD, OF HOUSTON, TEXAS.

METAL POLE.

Original No. 1,617,262, dated February 8, 1927, Serial No. 130,285, filed August 19, 1926. Application for reissue filed June 2, 1927. Serial No. 196,133.

My invention relates to an improved construction of metal poles or posts for use in the construction of telephone and telegraph lines, fence construction, and for any other purposes for which such poles may be found appropriate, whereby such a pole or post is provided of a minimum weight and maximum carrying strength, and also one that will be durable and substantially permanent in use, and by the use of which the disadvantages experienced in the use of wooden poles and posts are obviated, all as will be hereinafter more fully described and claimed.

Referring to the accompanying drawings which are made a part hereof and on which similar reference characters indicate similar parts, Figure 1 is an elevation of a complete pole set into the ground, Figure 2, a detail perspective of the lower end of the pole, Figure 3, a diagrammatic plan view of the top of the pole, and Figure 4, a detail view of other forms of angle irons that may be employed.

In the accompanying drawings a pole or post of my improved construction is shown constructed of a series of members of strands L-shaped in cross-section, a portion of which extend in a spiral direction lengthwise of the pole and another portion extend lengthwise of the pole in a spiral direction reverse to that of the first portion.

In the drawings the outside members 5 are formed into a left-hand spiral and the inner members 6 are formed into a right-hand spiral, there being seven members extending in each direction and crossing each other at intervals throughout the length of the pole. The flat faces of the inner members and outer members bear against each other at the crossing points, as shown most clearly at the top of Figure 2, at which points the members are secured together by any approved method but preferably by electric welding, although riveting or any other approved method may be employed if desired.

At the extreme bottom of the post or pole is a wide strong metal band 7 to which the lower ends of the members 5 and 6 are secured, and at a distance above the bottom another similar band 8 is provided to which said members are likewise secured, the band 8 being placed at the ground line or at the point where the greatest strain is placed upon the post in use. It will be understood, of course, that the bands 7 and 8 are of such width as may be appropriate for the particular character of pole and particular use to which it is to be put, and also that the members 5 and 6 are of appropriate size to make a post or pole of the strength and rigidity desired for any special purpose.

By reason of the special form of the members 5 and 6 secured together in a spiral form as shown, a pole with a comparatively small amount of metal is provided capable of carrying a comparatively great strain, the angles of the members being so positioned that each member supplements the other in resisting strain and lending strength and rigidity to the structure.

A similar band 9 is placed at the top of the pole to which the upper ends of the members 5 and 6 are secured in the same manner as indicated in respect to the bands 7 and 8.

In Figure 4 I have shown other forms of members angular in cross-section which may be used in lieu of the form shown in the principal figures, if desired.

It will be obvious to those skilled in the art that the posts forming the subject-matter of this invention may be made of any length or size desired to adapt them for any particular use or purpose and that such modifications as permited by the scope of the claims may be made without departing from the spirit of my invention.

Having thus fully described my said invention, what I claim as new and desire to secure by Letters Patent, is:

1. A post of the class described formed of two groups of continuous bars of angle iron, one group wound right-hand and the other group wound left-hand, the faces of the several bars of each group being set parallel with the corresponding faces of the other group and the bars of the two groups being secured together at crossing points, substantialy as set forth.

2. A post of the class described composed of an outer group of continuous bars of angle iron spirally wound in one direction, an inner group of continuous bars of angle iron spirally wound in the reverse direction, bands positioned between said outer and inner groups, the adjacent faces of the bars of the respective groups being adapted to rest against the outer and inner faces respectively of said bands, and means for securing the bars of said respective groups and said bands together, substantially as set forth.

3. A post of the class described comprising members angular in cross section extending in a spiral direction lengthwise of the post, part of said members in one direction and part in the reverse direction, the angles of the members extending in one direction being substantialy parallel with the angles of the members extending in the reverse direction, said members being secured together at their crossing points, substantially as set forth.

4. A pole formed of two groups of continuous members, the members of one group extending around the pole in a direction opposite the members of the other group, one or more of said members having a rib disposed substantially at right angles to the surface of the pole, substantially as set forth.

5. A pole or post formed of two groups of continuous members, the members of one group extending longitudinally of the pole at an angle to the members of the other group, certain of said members having upstanding ribs disposed substantially at right angles to the surface of the pole, substantially as set forth.

6. A pole formed of two groups of spirally wound continuous members, the members of one group being wound in a direction opposite to the members of the other group, each member having an outwardly directed rib substantially at right angles to the surface of the pole, substantially as set forth.

7. A pole or post comprising two groups of continuous members forming a hollow network structure, the members constituting one group extending longitudinally of the pole across the members of the other group, one or more of said members having a longitudinally extending strengthening rib on its back, substantially as set forth.

In witness whereof, I hereunto set my hand at the city of Washington, D. C., this 2nd day of June, 1927.

ADOLPH W. MALONE.